United States Patent
Sorraghan et al.

[11] Patent Number: 5,979,365
[45] Date of Patent: Nov. 9, 1999

[54] ANIMAL SORTING MODULE

[76] Inventors: Kevin Sorraghan; Timothy Sorraghan, both of Rockwood Meadows, 6780 G.V. Highway, Arcadia, Victoria 3613, Australia

[21] Appl. No.: 09/057,747

[22] Filed: Apr. 9, 1998

[30] Foreign Application Priority Data

Apr. 9, 1997 [AU] Australia .................... P06080

[51] Int. Cl.⁶ .................... A01K 1/00; A01K 29/00
[52] U.S. Cl. .................... 119/524; 119/840; 119/843; 119/502; 119/751
[58] Field of Search .................... 119/524, 512, 119/513, 514, 510, 502, 840, 501, 841, 842, 843, 847, 751, 423, 734, 735, 729, 730, 731, 736, 737, 738, 748, 752; 49/360, 49

[56] References Cited

U.S. PATENT DOCUMENTS

| | | | |
|---|---|---|---|
| 499,656 | 6/1893 | Clement | 49/404 |
| 510,511 | 12/1893 | Keith | 119/841 |
| 584,536 | 6/1897 | Auchly | 119/729 |
| 1,381,797 | 6/1921 | Caspers | 119/840 |
| 1,928,819 | 10/1933 | Neller | 119/524 |
| 4,138,968 | 2/1979 | Osterman | 119/842 |
| 4,593,425 | 6/1986 | Bivens | 15/53.3 |
| 4,771,737 | 9/1988 | Lynch | 119/734 |
| 4,813,379 | 3/1989 | Harmsen | 119/840 |
| 4,854,927 | 8/1989 | Reneau et al. | 493/27 |
| 5,183,008 | 2/1993 | Carrano | 119/840 |
| 5,531,660 | 7/1996 | Biese et al. | 493/243 |
| 5,595,144 | 1/1997 | Loher | 119/840 |
| 5,628,284 | 5/1997 | Sheen et al. | 119/840 |
| 5,706,763 | 1/1998 | Trethewey | 119/737 |

FOREIGN PATENT DOCUMENTS 1424330  2/1976  United Kingdom .

*Primary Examiner*—Michael J. Carone
*Assistant Examiner*—James S. Bergin
*Attorney, Agent, or Firm*—Samuels, Gauthier & Stevens, LLP

[57] ABSTRACT

An animal sorting module including a general frame (1) assembly defining a passageway (2) through which an animal can travel, the frame having a single entry point opening (3) at or near a first end (4) and two exit point openings (6) at or near a second end (7) wherein the entry point and at least one of the exit points are defined by a pair of elongate substantially cylindrical rollers (8) which can be moved between a first position occluding the opening and a second position exposing the opening.

6 Claims, 5 Drawing Sheets

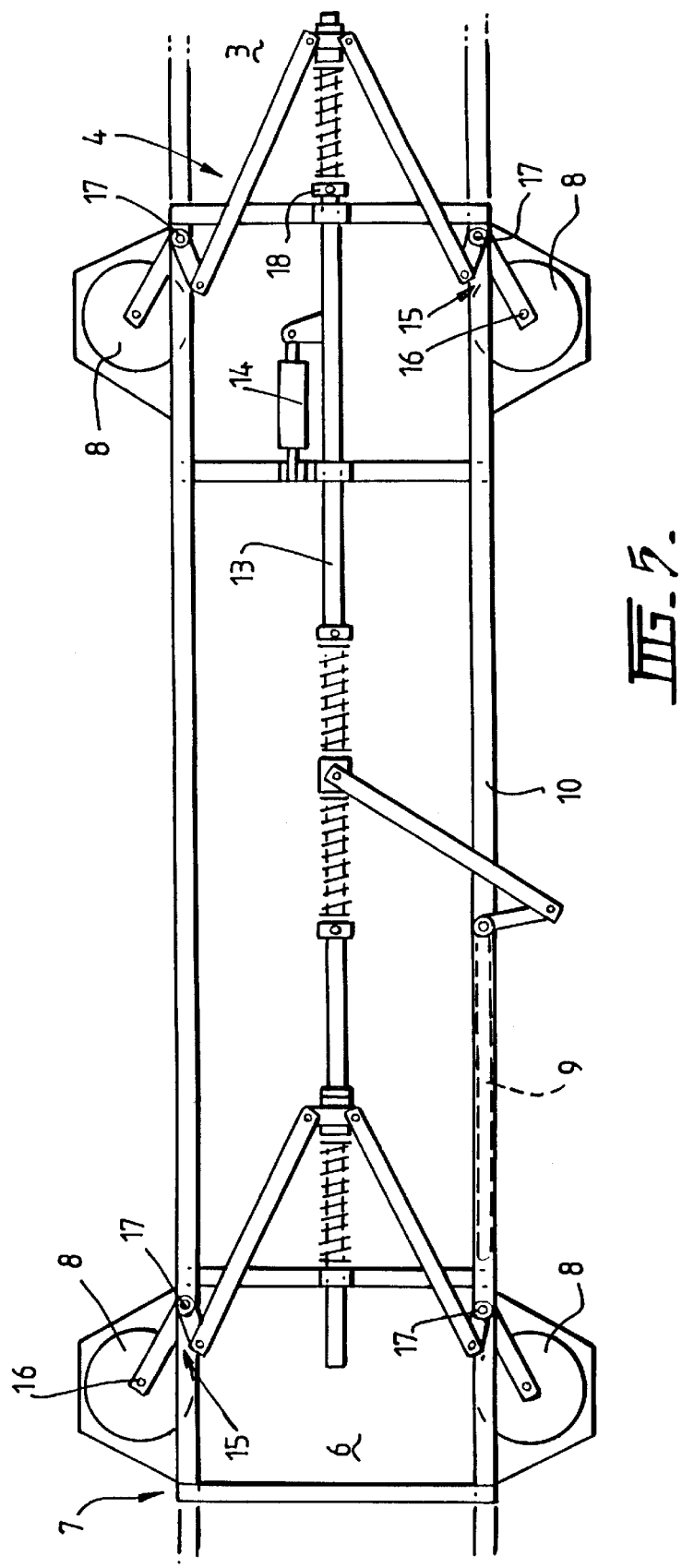

ANIMAL SORTING MODULE

INTRODUCTION TO INVENTION

This invention relates to the handling and organisation of animal livestock and in particular, to a sorting module to assist in the control of large animal livestock during specified operations like milking, shearing, drenching etc.

BACKGROUND TO INVENTION

The specific and selective handling of larger animal livestock has always presented a physical challenge to handlers particularly if the livestock is to be separated or sorted in an efficient manner. In an attempt to assist in such operations, various enclosures and gating systems have been devised as mechanical means of directing animals as required. However such systems, while providing adequate control over the sorting of groups of animals begin to encounter difficulties if individual animals are to be selectively sorted on a one-by-one basis. In particular, a group of animals often have a tendency to herd and push each other along such that conventional gating systems must act very quickly and decisively to only allow one animal to pass a given point at once if animals are to be sorted on an individual basis. In effect, it becomes necessary for conventional gating systems to open and close very quickly and precisely which invariably risk catching animals about the neck or rump if they are passing through in quick succession and can jam an animal midway through the system rather than precisely allowing one animal at a time through the gating system.

As discussed previously, in the past where only relatively large groups of animals required sorting these problems were minimal as a relatively small number of sorting operations were required for a given group of animals. However, the increasing use of computer technology in the farming and primary sector, has allowed very precise monitoring of livestock where each animal in a large herd can be tagged and treated as an individual by automated farming machinery. Accordingly, such technology has created a need for a highly efficient and precise animal sorting module that can process a continuous throughput of stock whilst providing the facility to sort each individual animal on demand.

STATEMENT OF INVENTION

Accordingly, in one aspect the invention provides an animal sorting module including a general frame assembly defining a passageway through which an animal can travel, said frame having a single entry point opening at or near a first end and two or more exit point openings at or near a second end wherein said entry point and at least one of said exit points are defined by one or a plurality elongate substantially cylindrical rollers which can be moved from a first position occluding said opening to a second position exposing said opening.

The elongate rollers defining said entry and exit points are preferably vertically orientated and act in tandem pairs to form a "roller gate" to occlude or expose said openings as required. The entry point and exit point may therefore each be defined by a set of vertically orientated rollers which can move co-operatively from a first position with each roller closing upon its mating roller at or near the center of said opening therein providing a substantial obstruction or occlusion of said opening to a second position where the rollers of each pair move apart to expose an opening between so as to allow an animal to pass through the gap so formed.

Accordingly in another aspect the invention provides a gating system characterized by a pair of vertically orientated substantially cylindrical rollers which are adapted to move co-operatively from a first position with each roller of said pair abutting its mating roller at or near the center of an opening to be gated to a second position where the said rollers move apart to expose said opening.

The rollers are preferably dimensioned in length and diameter to substantially occlude the openings in said passage by co-operation of a tandem pair thereof.

The rollers can be moved between said first position and said second position by any suitable means preferably with the allowance for compliance in the movement such that an animal caught partially traversing said opening will not be crushed or injured by the closing rollers but a bias applied thereto will ensure that said rollers will close immediately any such animal passes through the rollers.

The biasing is preferably provided by a resilient means against which the rollers move between said first and second positions.

The animal sorting module preferably has said entry point positioned at the first end of said frame and a first exit point positioned at the second end of said frame and opposing said entry point wherein said entry point and said first exit point are defined by said roller gates. The second exit point may be positioned at the side of said frame near said second end and defined by a gate.

DETAILED DESCRIPTION

One embodiment of the invention will now be described with reference to the Figures where:

FIG. 5 shows a plan view of the module in a second mode.

Figure 1:
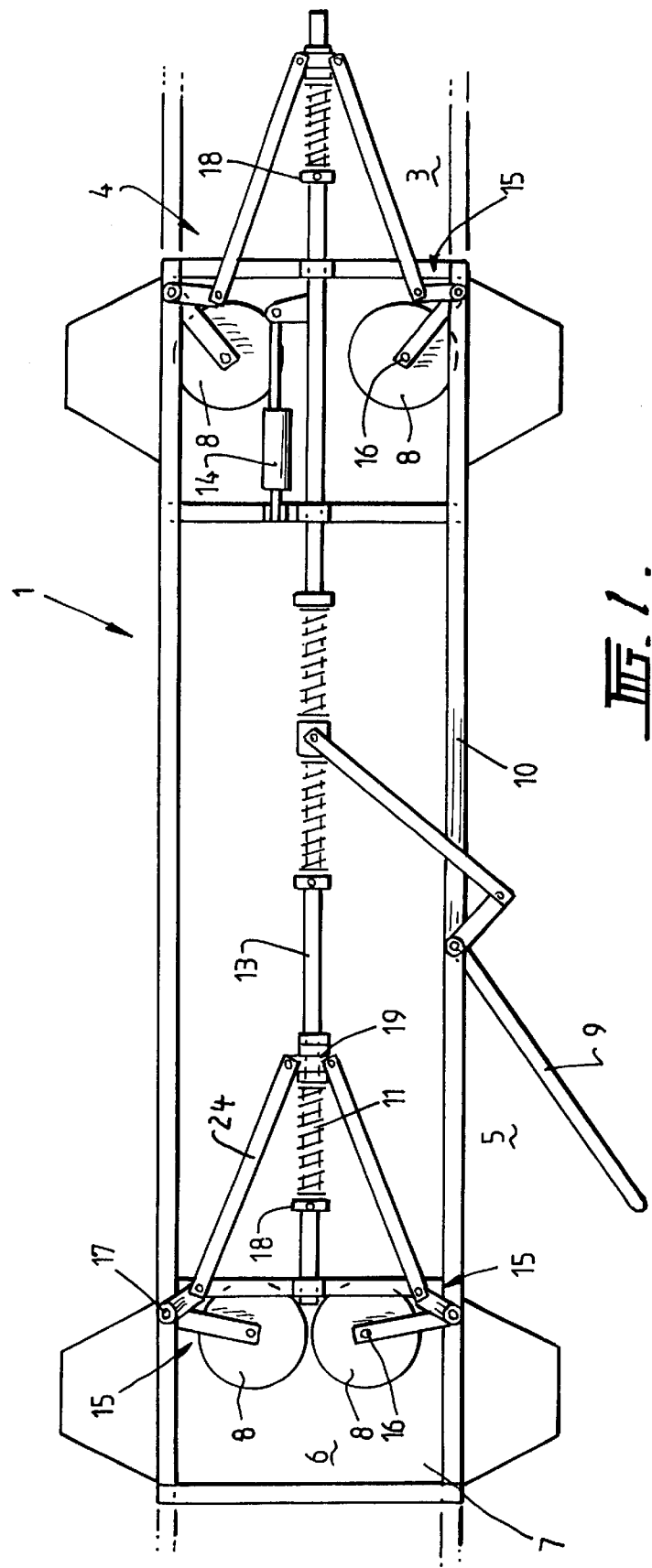
FIG. 1 shows a plan view of the animal sorting module.

Referring firstly to FIG. 1, the animal sorting module of the invention can be seen to comprise a general frame assembly 1 in the form of an elongate passageway through which an animal can pass. The dimensions of the frame would be determined in accordance with the type of animal to be sorted; however, generally the size of the frame is such that no more than one animal can fit into the passageway across the width thereof and a maximum of two animals can fit into the passageway lengthwise. The frame defines a general elongate passageway through which an animal can be urged to travel and the framework includes a single entry point 3 at a first end 4 in the form of an opening in the frame through which an animal can pass. At the other end of the frame, being the second end 7, a first exit point 6 is located such that the entry point 3 and first exit point 6 are opposed to one another at alternate ends of the elongate passageway. In addition to the first exit point, the animal sorting module is provided with a second exit point 5 positioned on the side 10 of said frame. The entry and exit points, in particular, the entry point 3 and first exit point 6, are defined by a pair of vertically orientated elongate cylindrical rollers 8 which form a "roller gate". The elongate roller sets act in a co-operative fashion to move between a first position where both elongate rollers are drawn together thereby effectively occluding the opening provided by the end of the frame to a second position where each roller of the pair moves apart from the other to expose an opening therein between of sufficient dimension to allow an animal to pass through the gap so formed. The elongate rollers are dimensioned to have a diameter equal to about half the width of the available opening and a height equal to about the height of the available opening. In this manner, the use of a tandem pair of rollers can fully occlude the available opening both physically and visually. The use of the pair of vertically orientated cylindrical rollers to open and close the entry and first exit points of the module, provides a novel and effective roller gate which can be made to act quickly thereby ensuring that only one animal at a time is allowed to pass through an opening. In addition to the speed of action of the roller gate and the substantial dimension of the rollers which minimise the possibility of injury to an animal, the elongate rollers are formed of visually opaque material such that not only a physical barrier but also, a visual barrier is formed which further minimises the unsettling and disquiet caused to a collection of animals being processed through the sorting module.

Figure 3:
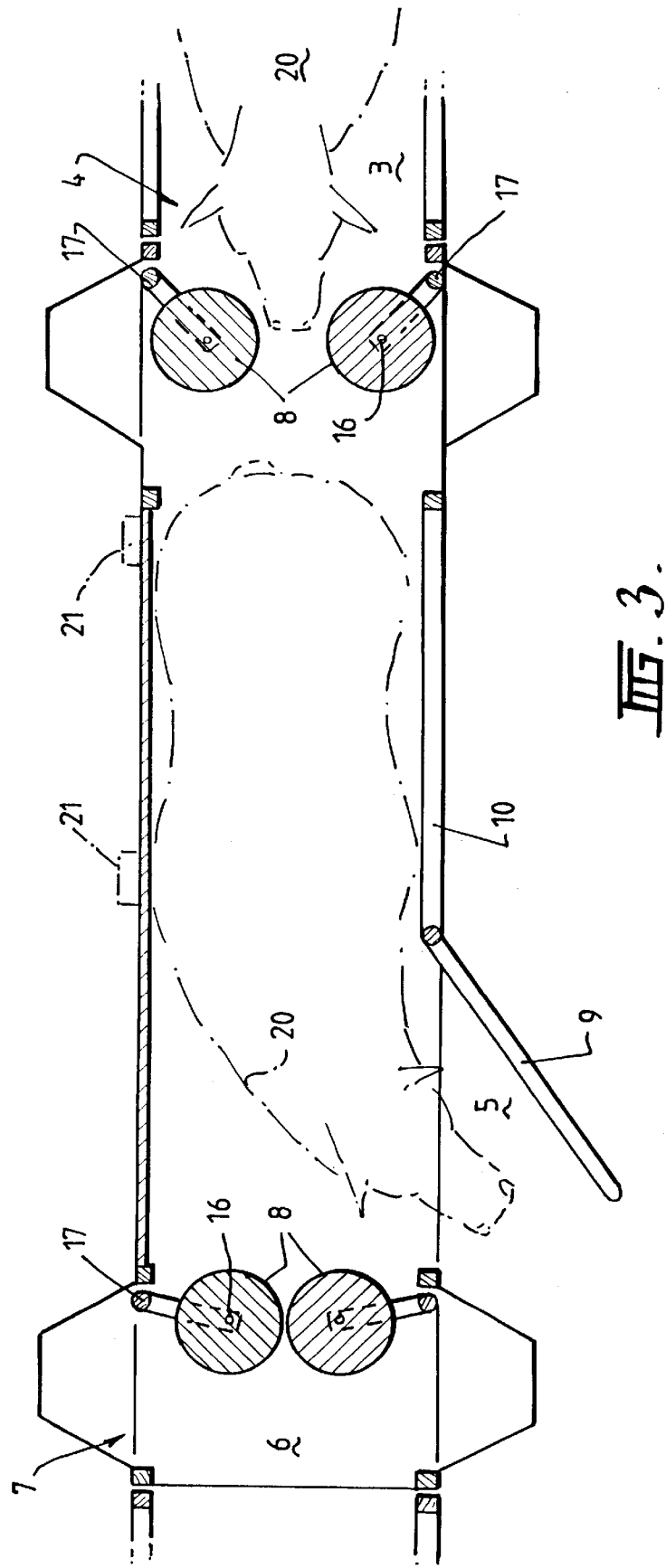
FIG. 3 shows a plan view of the module in use (with mechanicals removed).

The mechanism of action of the roller gate is provided by an overhead centrally located actuating bar 13 which can move forward and aft in a longitudinal direction by the action of an air cylinder 14. The elongate rollers 8 are held in vertical orientation by attachment to a first arm of a crank 15 by way of an axle 16 so as to allow free rotation of the rollers in the vertical orientation. The crank is attached by pivotal engagement 17 to the general frame. The second arm of the crank 15 is attached to an intermediate arm 24. The intermediate arm is activated by the actuating bar 13 via a spring 11 which forms a compliant and resilient mechanical connection between a collar 18 fixed to said actuating bar and a journal 19 to which the intermediate arm is connected which can freely move up and down the actuating bar 13. In this manner, the elongate rollers 8 are drawn to the closed position by the actuation of the actuating bar 13 moving in a direction from the second end 7 of the frame to the first end 4 of the frame causing the collar 18 to move in the same direction and applying force to the spring 11 which is transmitted to the journal 19 and therein transmitted to the intermediate arm 24 and crank 15 which causes the crank to rotate about the pivot 17 thereby drawing the elongate rollers 8 toward the center of the frame. In order to ensure that an animal caught in between the elongate rollers 8 is not crushed, the spring 11 allows a measure of compliance to occur between the activation of the actuating bar 13 and the actual movement of the journal 19 (as is shown with the rollers partially opened at the entry point 3) such that if an animal is caught in between, the spring can take up sufficient movement to allow an animal to squeeze through such that once the animal has traversed the rollers, the spring returns to its substantially relaxed state thereby causing the journal 19 to quickly move forward causing the elongate rollers to snap shut. This feature is clearly illustrated in FIG. 3 where the nose of an animal 20 has prevented the rollers at the entry point 3 from fully closing. Once the animal retracts, the rollers will snap shut. An additional feature may be the provision of plastic or inflatable rollers which will yield if they strike an animal. The quick action of the rollers in this situation has the effect of immediately closing the roller gate in front of any animal that might be pushing or moving up on the animal having just traversed the opening. Such a quick action causes a physical and visual barrier to the following animal thereby dissuading it from attempting to push through.

Figure 4:
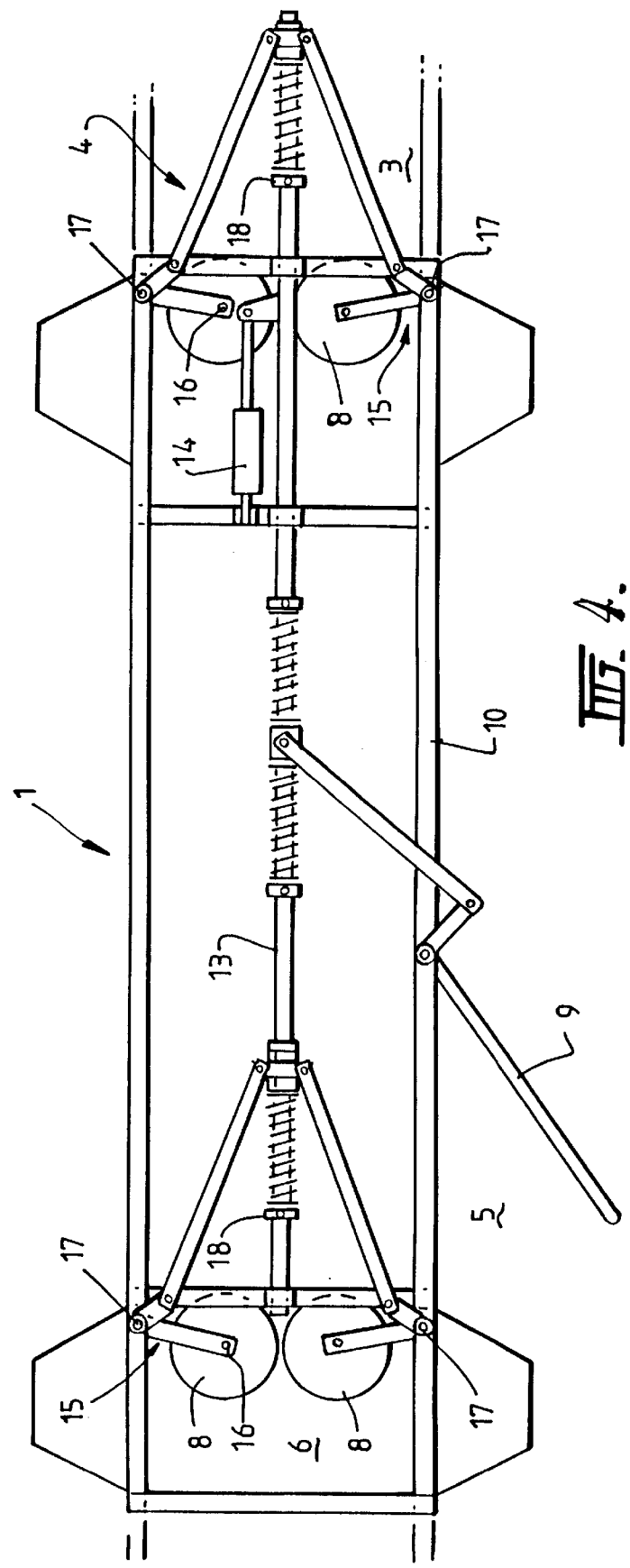
FIG. 4 shows a plan view of the module in a fist mode.

Once an animal has been duly located within the confines of the passageway, the action of the exit point openings can be considered, such that a choice can be made as to whether an animal confined within the sorting module is directed towards the first exit point 6 or the second exit point 5. The action of the elongate rollers at the exit point 6 is analogous to that at the entry point 3 and the action of the elongate roller activating mechanism at both entry point 3 and exit point 6 can be co-ordinated or operated independently. Similarly, a compliant opening mechanism is provided for gate 9, although in this embodiment of the invention, the elongate rollers are not incorporated into the gate 9. In the particular embodiment of the invention detailed herein, the elongate rollers forming the roller gates and the side gate are operated in a co-ordinated manner such that in a first mode shown in FIG. 4, the actuating bar 13 has moved toward the first end 4 and caused both roller gates to close and the side gate 9 to open. In this mode, an animal "caught" inside the module will only have one option, to exit via exit point 5. In a second mode shown in FIG. 5, the actuating bar has moved back toward the second end 7 and caused both roller gate sets to open and simultaneously closed the side gate 9. In this mode, an animal is fee to pass into the module and also pass straight through and out the first exit 6. In this manner, the movement of animals through the module can be substantially controlled with a minimum of mechanical movements and options.

Figure 2:
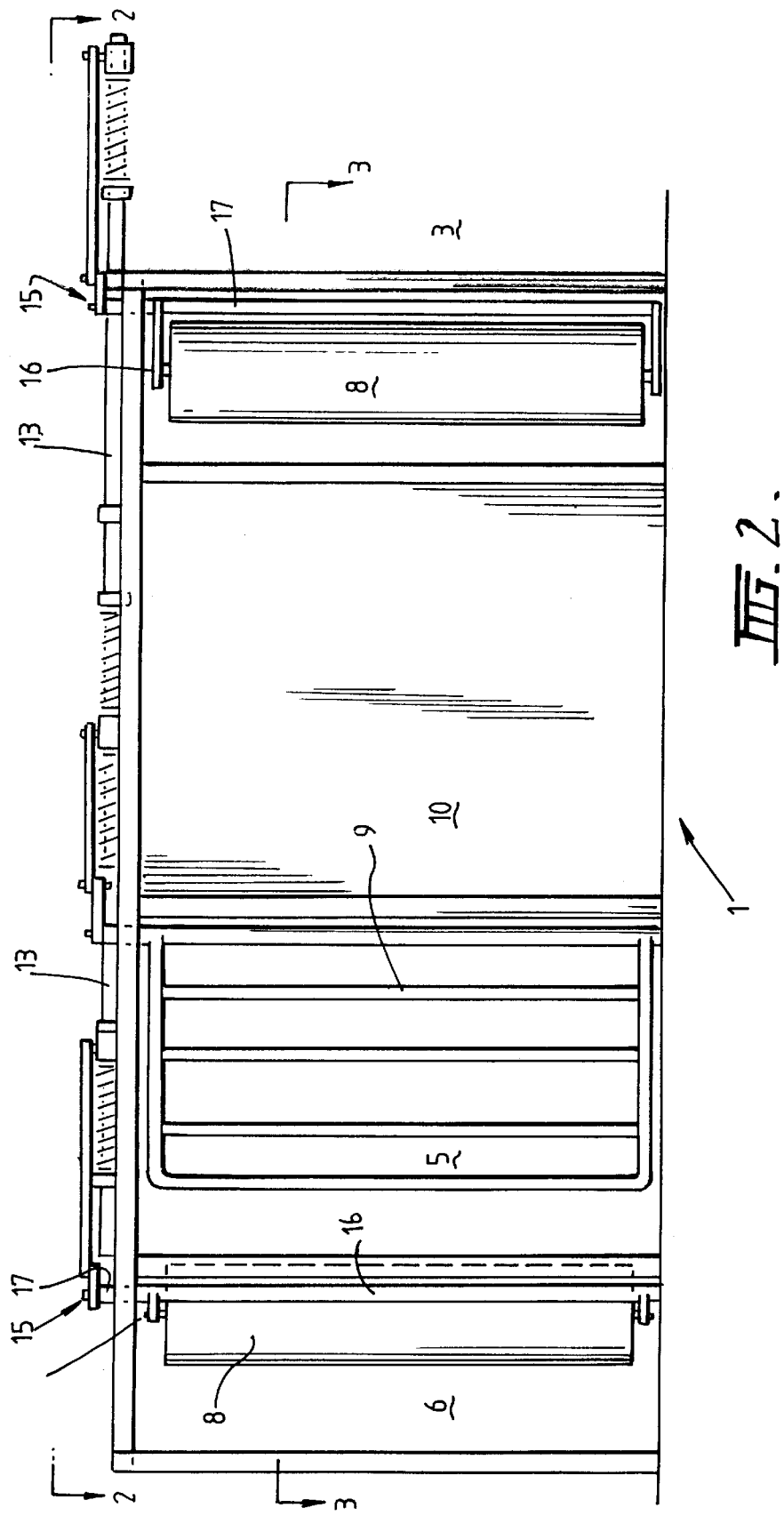
FIG. 2 shows a side view of the module.

Referring now to FIG. 2, a side view is provided of the animal sorting module, where the entry point 3 is provided at the first end 4 of the general framework 1 such that a passageway is provided along the length of the module from the first end 4 to the second end 7 where the first entry exit point 6 is provided. At the side 10 of the animal sorting module, the second exit point 5 is provided with a gate 9.

In use, the animal sorting module provides a highly efficient means of sorting animals traversing through the module by selection of either one of first or second exit points from the module which lead to respective pens thereby allowing a herd of animals entering from entry point 3, to be sorted into respective pens after having exited the module. The animal sorting module can be operated either manually or preferably automatically utilizing infrared or other sensors 21 which can be positioned along the length of the general frame assembly 1. Such sensors can be linked to programed computers to detect particular animals which will have suitable identification means which can be read by the sensors 21. The use of identification systems on animals is well known in the art and a typical example may be the use of a multi-stationed milking machine where a plurality of animals are feed onto a rotating milking station and as each animal enters a bay of the milking station, particular and dedicated feed can be presented to each particular animal in accordance with its own requirements. Upon exiting such a milking machine, the animals would be presented to the animal sorting module and upon presentation of the first animal to the entry point 3 of the module, the elongate rollers 8 can be opened by movement of the actuating bar 13 thereby allowing a first animal to pass into the passageway. Immediately, the sensor 21 has detected the entry of an animal, the individual animal is monitored and according to data previously supplied to a computer, a determination can be automatically made if the individual is to be kept in the passageway or exited via exit point 6 or 5. If the individual is to be processed through exit point 6, immediately the individual has passed the second sensor 21 the rollers (both sets) will begin to close but allowing enough time for the individual to pass through the rollers at exit point 6. If the individual is only part through, the spring will take up the closing of the rollers around the flank of the individual which will immediately respond by bolting through the gate thereby allowing the gate to close behind. Alternatively, if the animal is required to exit via exit point 5, the elongate rollers at the first end 4 and second end 7 remain closed with the gate 9 open allowing the animal to enter into the required enclosure. Once the animal has cleared the gate 9, the mechanism is then returned to the open position with the elongate rollers at the entry point 3 opened to allow the next animal to pass through. If the next animal is required to exit via exit point 6, the gate 9 remains closed while the elongate rollers remain open to allow the animal to pass out the first exit point. In the event that more than one animal at a time manages to enter the passageway, the provision of elongate rollers 8 at the exit point 6 allows ready and confident control of the animals whereby the first animal would be allowed to exit the first exit point 6 with the elongate rollers closing and upon the exit of that animal allowing the second animal to exit via exit point 5 which automatically opens as the rollers close.

The invention provides for the first time a comprehensive and safe animal gating system and sorting module which allows for the precise control and sorting of animals one-by-one with a minimum of disturbance to a herd of animals by the provision of suitably dimensioned vertically orientated elongate rollers 8 as a means of opening and closing an opening.

The gating system can be used in most situations where conventional gates are used; however, the system is optimally used in an animal sorting module as described. The animal sorting module can be constructed in a fully assembled form or alternatively a kit for ease of transport.

The advantages of the invention extend to numerous applications and the particular embodiments disclosed are by way of example only.

The claims defining the invention are as follows:

1. An animal sorting module comprising:

a general frame assembly defining a passageway through which an animal can travel, said frame having a single entry point opening at or near a first end and at least two exit point openings at or near a second end, wherein said entry point and at least one of said exit points are defined by a tandem pair of elongate substantially cylindrical vertical rollers which can be moved between a first position occluding said opening and a second position exposing said opening, said rollers being dimensioned in length and diameter to substantially occlude the openings in said passageway.

2. A module according to claim 1 wherein the elongate rollers move co-operatively from a first position with each roller abutting its mating roller at or near the width wise center of said passageway therein providing a substantial occlusion of said openings to a second position where each roller moves apart from its mating roller to expose said openings.

3. A module according to claim 1, wherein said rollers are fitted to either side of the frame of said module by rotatable suspension from the first arm of a crank which is pivotally fitted to said frame such that the second arm of said crank can be operated by an actuating means to cause said rollers to move from said first to said second position.

4. A module according to claim 3 wherein a resilient means is incorporated between said actuating means and said rollers to provide compliant closing of said rollers if required.

5. A module according to claim 4 wherein said resilient means is a spring.

6. A module according to claim 3, wherein said actuating means is a centrally and longitudinally located elongate bar which co-operates via a spring with the respective second arms of a pair of cranks associated with said tandem pair of rollers.

* * * * *